Figure 3:
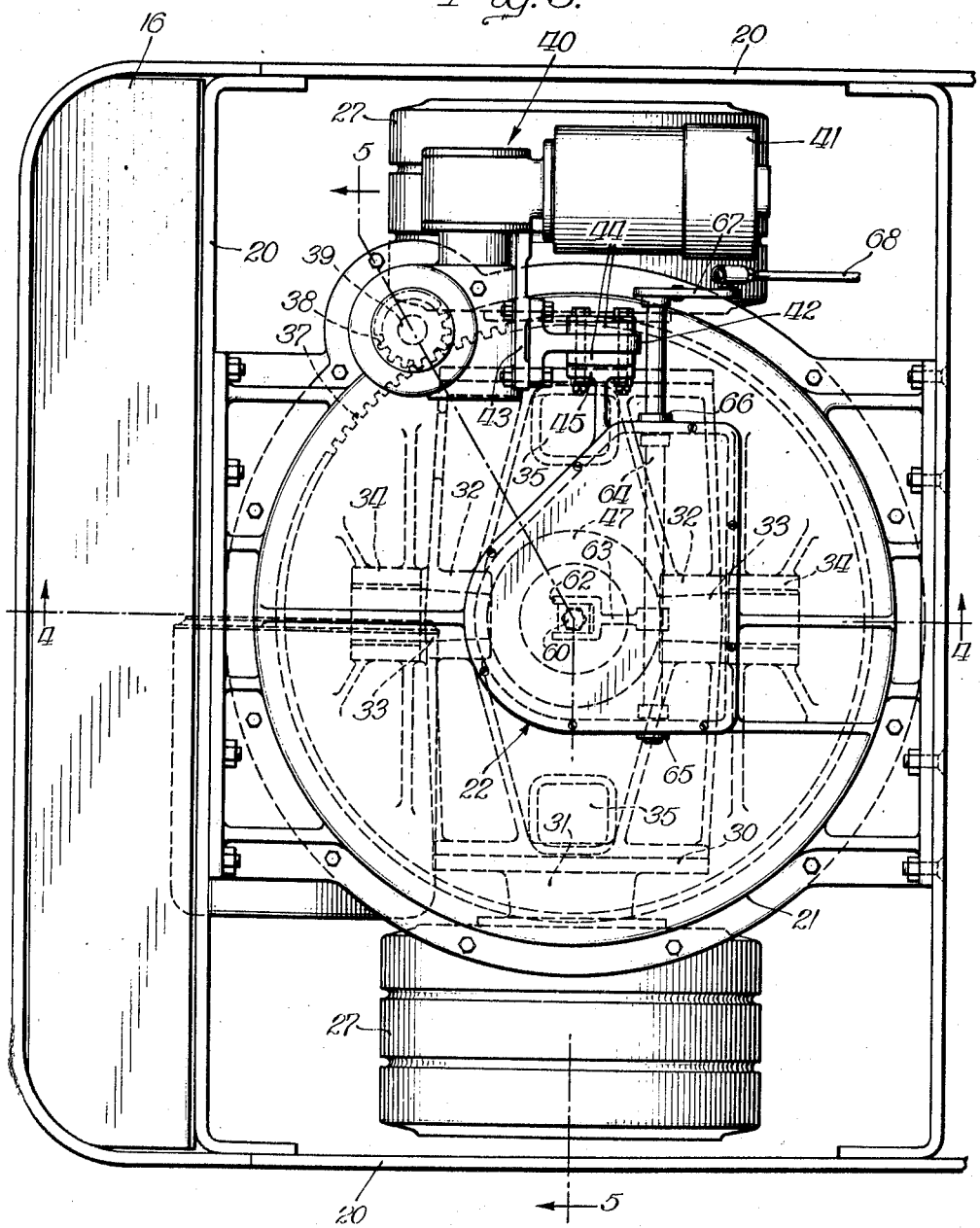

Dec. 15, 1942.  B. ULINSKI  2,305,578
STEERING ASSEMBLY FOR INDUSTRIAL TRUCKS
Filed March 8, 1939  6 Sheets-Sheet 1
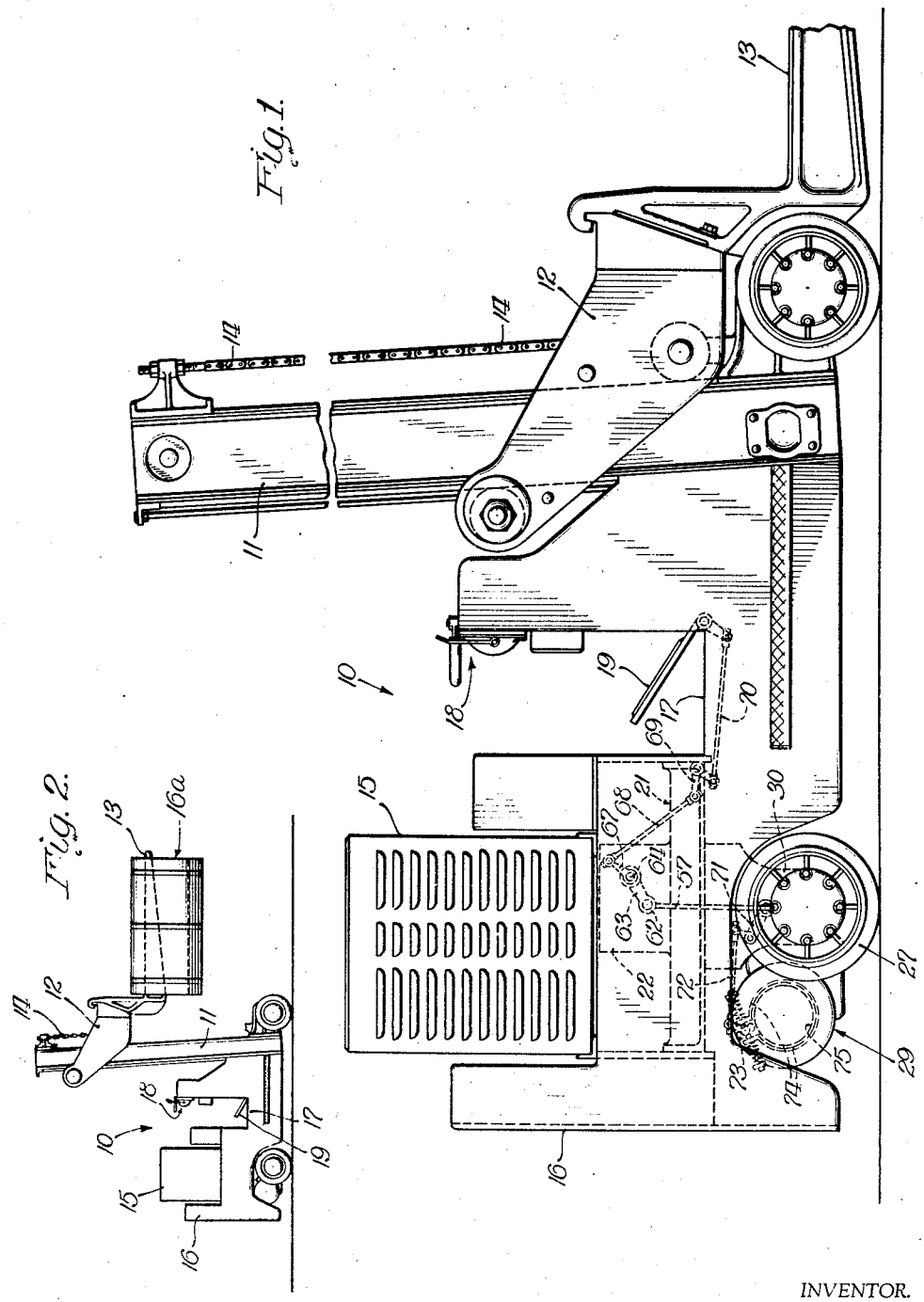
INVENTOR.
B. Ulinski
BY
ATTORNEY.

Dec. 15, 1942.          B. ULINSKI          2,305,578
STEERING ASSEMBLY FOR INDUSTRIAL TRUCKS
Filed March 8, 1939          6 Sheets-Sheet 2

INVENTOR.
B. Ulinski
BY
A. H. Golden
ATTORNEY.

Dec. 15, 1942.   B. ULINSKI   2,305,578
STEERING ASSEMBLY FOR INDUSTRIAL TRUCKS
Filed March 8, 1939   6 Sheets-Sheet 3

INVENTOR.
B. Ulinski
BY A.H. Golden
ATTORNEY.

Dec. 15, 1942. B. ULINSKI 2,305,578
STEERING ASSEMBLY FOR INDUSTRIAL TRUCKS
Filed March 8, 1939 6 Sheets-Sheet 5

INVENTOR.
B. Ulinski
A. H. Golden
ATTORNEY.

Dec. 15, 1942.  B. ULINSKI  2,305,578
STEERING ASSEMBLY FOR INDUSTRIAL TRUCKS
Filed March 8, 1939  6 Sheets-Sheet 6
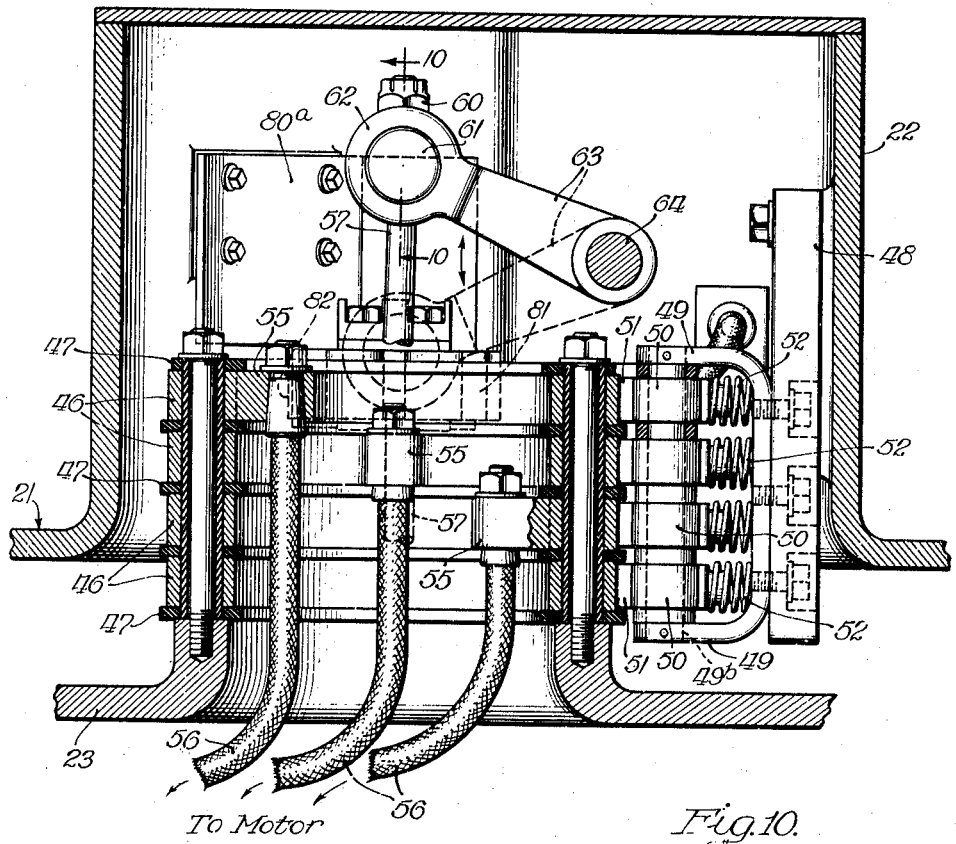
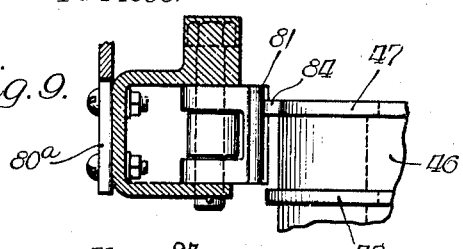
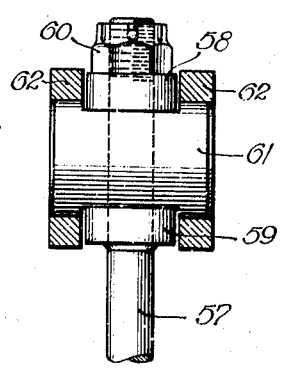
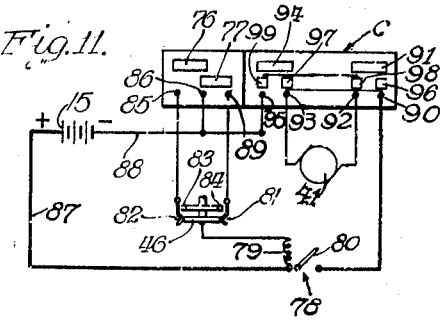
INVENTOR.
B. Ulinski
A. H. Golden
ATTORNEY.

Patented Dec. 15, 1942

2,305,578

UNITED STATES PATENT OFFICE 2,305,578

STEERING ASSEMBLY FOR INDUSTRIAL TRUCKS

Bronislaus Ulinski, Chicago, Ill., assignor to The Yale & Towne Manufacturing Company, Stamford, Conn., a corporation of Connecticut Application March 8, 1939, Serial No. 260,473

22 Claims. (Cl. 180—79.1)

This invention relates to electric industrial trucks of the type used for hauling heavy loads in manufacturing plants.

As the use of electric trucks in industry has broadened, increasingly heavy loads have been handled, until today there is a great demand for an electric truck which will handle extremely heavy loads, in fact, loads upwards of sixteen tons. Not only must these loads be handled effectively and swiftly, but the industrial trucks which do the handling must be short in wheel base, easily manipulated in the narrow aisles found in most industrial plants, and be readily controlled by a single operator. A further feature of extreme importance which must be considered is the safety of the operator.

The truck which I show in this application as incorporating my invention, is of the type having an elevating platform at one end thereof, with the load carrying platform of the truck overhanging the wheels of the truck. To balance the overhanging load, there is mounted at the other end of the truck a power source which may be in the form of a battery or a gas-electric unit. In many cases, heavy counter-weights are necessary to balance the weight of the overhanging load, and these are provided in the truck shown in accordance with standard practice.

The operator's platform is in the center of the truck, and contributes advantages in visibility and ease in operation which are well set forth in my application Serial No. 159,824, filed August 19, 1937, now Patent No. 2,207,688, issued July 9, 1940.

Broadly, the contribution which I believe I have made to the art is the mounting of the driving wheels forming the traction unit of my truck under the power unit, be it battery or gas-electric, with the feature that the entire traction unit is steered by an electric motor, preferably controlled from the central operator's platform. I fully appreciate that broadly, a bodily rotatable traction and steering unit is old in the art, having been shown in the Carr Patent No. 1,185,630, dated June 6, 1916, owned by the Automatic Transportation Company, for which company the present invention has been developed. I fully appreciate also that power steering units for electric industrial trucks have been developed, one being shown in my patent application Serial No. 143,912, filed May 21, 1937, now Patent No. 2,167,224, issued July 25, 1939.

However, I have combined a power steering unit with a bodily rotatable traction unit in a novel and unique manner so as to obtain exceedingly simple direct and efficient operation. Similarly, I have evolved control mechanisms for the brake of the electric traction motor, and also for the electric circuit of the steering motor, which are vital parts of my invention.

More in detail, my electric truck has a main frame which is preferably equipped with a steering assembly mounting in the shape of an inverted cup. Rotatable relatively to this inverted cup is what I prefer to call a steering disk, which is preferably circular in form, and which preferably also carries a ring gear. This ring gear I prefer to form on the periphery of the disk.

The entire traction unit is secured to the disk for rotation therewith, but preferably is capable of some pivotal movement relatively to the disk, whereby the wheels may better follow a rough terrain. The traction unit and the rotatable steering disk are rotated together to steer the truck by a steering motor which is mounted on the main frame, and which has a pinion in engagement with the ring gear formed on the periphery of the steering disk.

Power is transmitted to the traction motor through a series of collector rings rotatable with the traction unit, and preferably secured to the rotating steering disk. These collector rings of course receive power from a series of stationary brushes connected to the power unit, suitable conductors running from each of the collector rings to appropriate parts of the traction motor, that is, to the field coils and armature thereof.

The particular construction set forth lends itself admirably to the control of the steering motor unit, so that when the wheels have been turned to a particular position relatively to the truck, the steering motor circuit will be broken, and further rotation impossible. The reasons for this are, of course, obvious.

To accomplish my purpose, I preferably use a controlling or contactor circuit for the steering motor. This contactor circuit is common in the art, and is generally used in the art to relieve the motor controller of arcing. Thus, it is only after the motor controller is in a particular circuit closing position that the contactor circuit is closed and the contactor points thus accept the surge of electricity. Reversely, the circuit is first broken at the contactor and then at the controller.

In my invention, the contactor circuit for the steering motor includes a pair of controller brushes, one corresponding to forward and one corresponding to reverse. When the steering wheels move to one predetermined extreme position, one of the brushes is moved to circuit opening position, and will of course open the contactor circuit of the steering motor. When the steering motor is reversed, its contactor circuit will be closed through the other brush, and it will be possible to start the operation of the steering motor in a reverse direction. Such rotation of the steering motor will rotate the wheels and allow the first brush to move back into circuit making position.

As a further feature of the invention, I prefer to utilize one of the collector rings as a cooperating member for making circuit with the two brushes of the steering motor contactor circuit. Furthermore, I provide means such as a cam fixed relatively to the said collector ring, this cam being adapted to throw one brush out of contact with the collector ring in one extreme position of the steering wheels, and to throw the other brush out of contact with the collector ring in the other extreme position of the steering wheels.

A further fine result which I achieve from the arrangement of the collector rings and steering apparatus is the ready control of the brake of the traction unit. I mount a rod for vertical movement in the steering axis and, of course, through the centers of the collector rings, this rod being connected at one end to linkage operable by the brake pedal of the truck, and being connected at its other end to the brake operating cam. In this way, a very effective control of the motor brake is possible, the result being much more effective than set forth in the Carr patent previously referred to.

I have thus described my invention generally in order that a proper appreciation of its scope and breadth may be possible. There follows a detailed description of a preferred form of my invention, it being understood that other forms thereof will readily occur to those skilled in the art.

Figure 4:
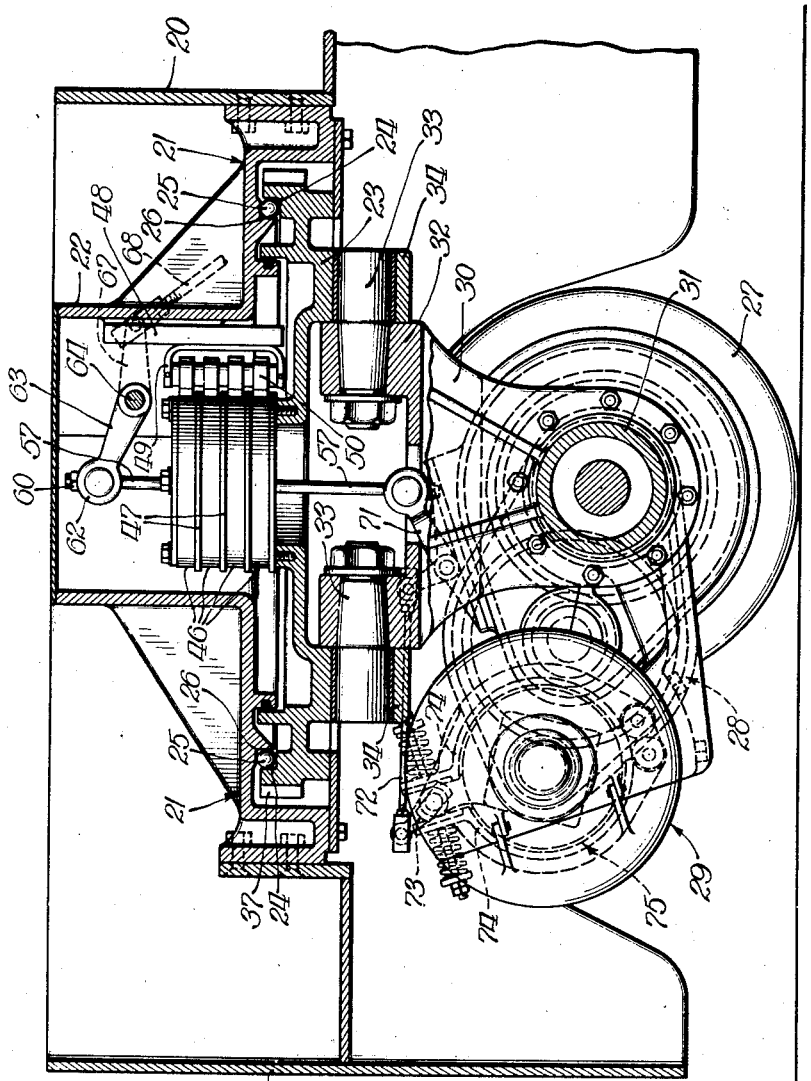
Figure 5:
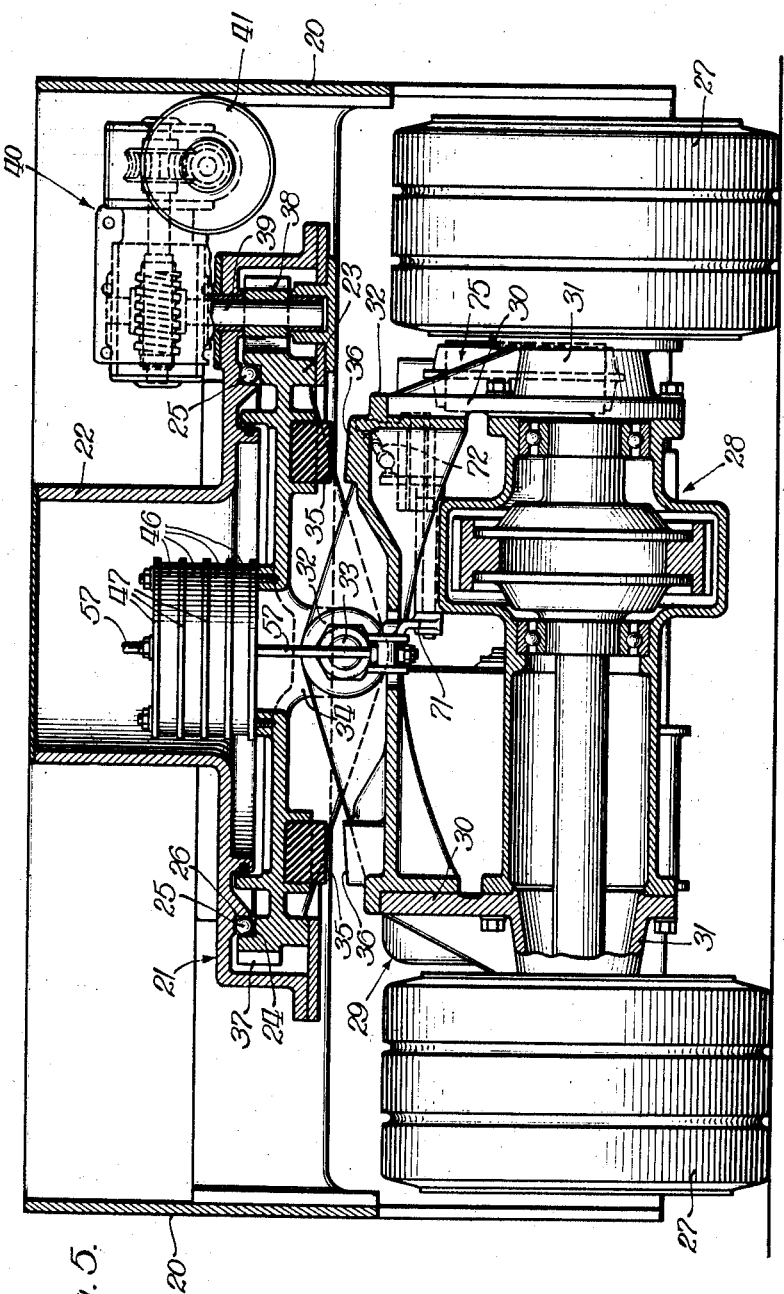
Figure 6:
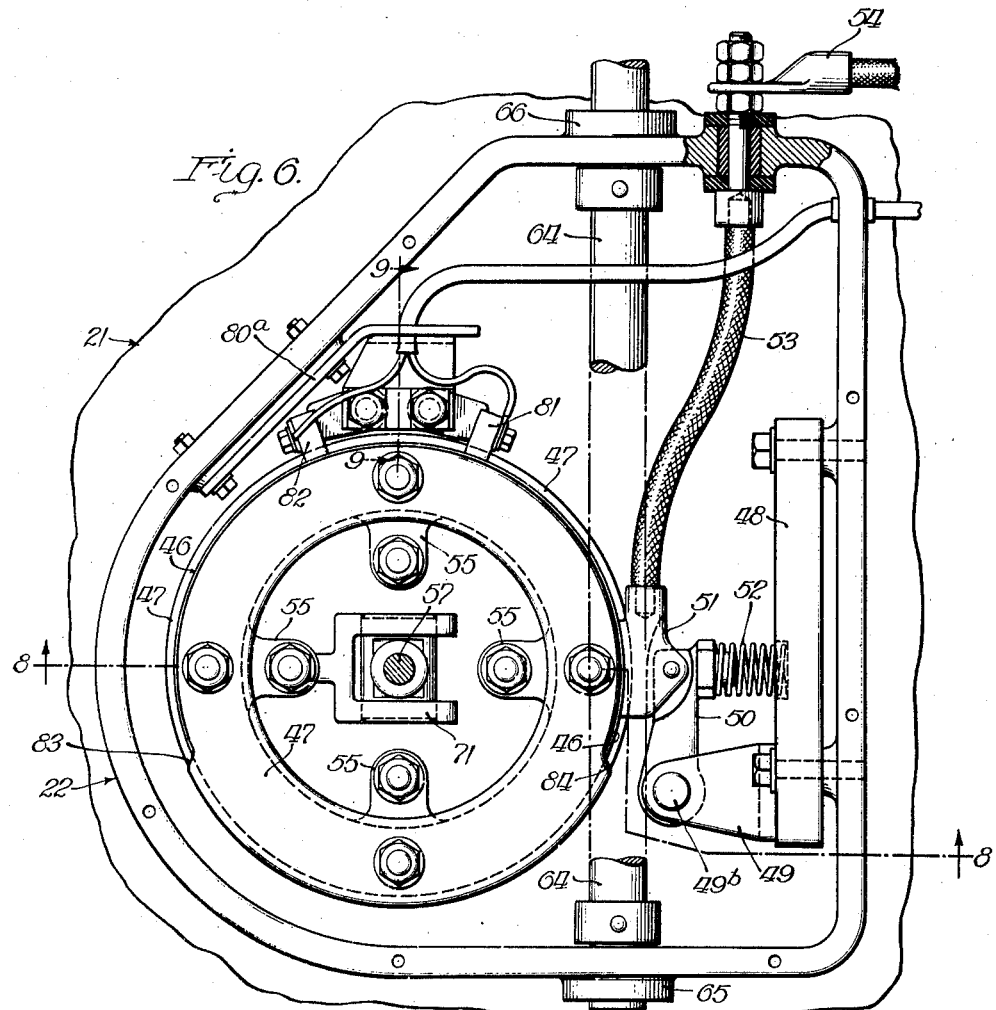
Figure 7:
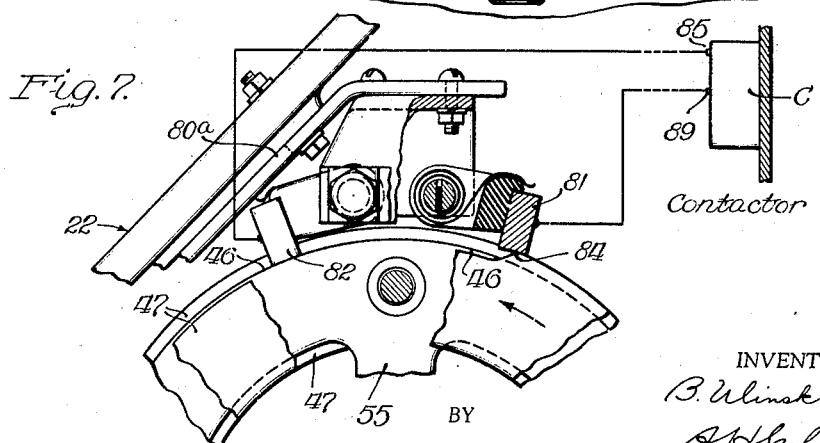

Referring now to the drawings, Fig. 1 is an elevation of an electric truck embodying my invention. Fig. 2 is a similar view of the same truck showing the elevating platform in elevated position. Fig. 3 is a view looking down on the rear end of the main frame of the truck showing the upper surface of the inverted cup shaped housing and the mounting of the steering motor relatively thereto. Fig. 4 is a view along lines 4—4 of Fig. 3. Fig. 5 is a view along lines 5—5 of Fig. 3. Fig. 6 is an enlarged view of part of Fig. 3, but with a certain cover plate removed, and with various parts shown that are not in Fig. 3. Fig. 7 is an enlarged view of certain parts of Fig. 6. Fig. 8 is a view along lines 8—8 of Fig. 6. Fig. 9 is a section taken along lines 9—9 of Fig. 6. Fig. 10 is a section taken along lines 10—10 of Fig. 8. Fig. 11 is a schematic wiring diagram illustrating the controlling of the contactor circuit of the steering motor. I do not in this figure show all the various circuits of my truck because I believe it unnecessary to do so, and because I believe that a better understanding of the control is possible through a study of the simplified circuit of Fig. 11.

It will be well to indicate at this time that while I have described generally the most important features of my invention, there are many other features thereof which will be described in detail in connection with the drawings, and which form important parts of my contribution. Naturally, I do not wish to be limited in my patent monopoly except as may be required by the state of the art.

Referring now more particularly to the drawings, and especially Fig. 1, reference numeral 10 indicates generally an electric truck having at one end thereof uprights 11 on which is mounted for vertical movement a lifting carriage 12 having a boom 13 for supporting a load. It may be well to indicate that my invention is of course applicable to many types of trucks, the present type being described as typical of a truck in which my invention will readily function.

The carriage 12 is elevated through a chain 14 which is actuated by a suitable motor deriving its power from a power unit 15, which in this case is shown as a gas-electric unit. The gas-electric unit 15 and a counter-weight 16 help to balance the weight of the load 16a, shown in Fig. 2, to prevent the truck from tipping, all as will be understood by those skilled in the art.

The operator of the truck stands on the depressed central platform 17, and through suitable controllers, designated generally by reference numeral 18, he operates the various motors of the truck including a steering motor to be described presently. The pedal 19 is termed in the art a safety pedal, and in its position of Fig. 1, acts to shut off the power to the traction unit to be described presently, and also applies the brake of the traction unit. The function of the pedal 19 is well understood in the art and need not be explained further here. Those that wish to make a more detailed study of pedal 19 are referred to my application Serial No. 188,511, filed February 3, 1938, for a Controller, now Patent No. 2,267,381, issued Dec. 23, 1941.

Referring now to Figs. 3, 4 and 5, I show the mounting of the steering and traction unit of my invention. Fig. 3 will best be understood if it be considered that the view is taken looking down on that portion of the main frame which is exposed when the power unit 15 is removed. Figs. 4 and 5 are, of course, views taken through section lines 4—4 and 5—5 of Fig. 3.

It will be seen that the main frame of the truck is indicated by reference numeral 20, there being secured to this main frame and forming an integral portion thereof, what I prefer to term an inverted cup shaped housing 21. This inverted cup shaped housing 21 has an upwardly extending cylindrical portion defined by a continuous peripheral wall 22. Mounted for rotation relatively to the housing 21 is what I term a rotating steering disk 23. This steering disk 23 has a bearing portion 24 which cooperates with a series of ball bearings 25, which in turn rest against the bearing portion 26 formed on the housing 21. Through the ball bearings 25, the inverted cup shaped housing 21 is supported by the steering disk 23, the steering disk 23 in turn being secured to the driving or traction unit.

The driving or traction unit comprises a pair of wheels 27 driven in the usual way by a differential and a set of gears designated generally by reference numeral 28, and of themselves forming no part of this invention. The gearing and differential 28 are in turn driven by an electric traction motor 29. Suitable brackets 30 extend upwardly from the axle housing 31 of the traction unit, and terminate in what I prefer to call a beam 32, which through trunnion shafts 33 and bearings 34, is secured for pivotal movement relatively to the rotating steering disk 23. Rubber pads 35 on the steering disk 23 cooperate with upstanding lugs 36 on the beam 32 for limiting the pivotal movement of the beam and the traction unit relatively to the steering disk 23.

The outer periphery of the steering disk 23 is shaped to form a ring gear 37, the teeth of which are in mesh with a pinion 38 secured on the shaft 39 extending from what I call the steering unit 40. The shaft 39 is supported for rotation through suitable bearings on the inverted cup shaped housing 21, and is rotated through suitable gearing in the steering assembly 40 actuated by the electric steering motor 41. The torque of the steering assembly 40 about the axis of shaft 39 is accepted by brackets 42 and 43 secured through the intermediary of the rubber washers 44 to a bracket 45 upstanding from the housing 21.

It is of course obvious that the motor 41 is capable of rotating the shaft 39, pinion 38, and therefore the steering disk 23, thereby rotating the entire traction unit and steering the truck. In so moving, the ball bearings 25 accept, of course, all of the rotary and vertical thrusts.

Referring now to Figs. 4, 5, 6 and 8, I shall describe the assembly whereby electric power is transmitted from the power unit 15 to the traction motor 29. Supported by the steering disk 23 are a series of four collector rings 46 separated from one another and the steering disk 23 by circular insulation washers 47. The centers of the collector rings 46 are, of course, placed to coincide with the center of rotation of the traction unit and steering disk 23, that is, in the steering axis.

It will be noted that the collector rings 46 lie in the cylindrical portion of the inverted cup shaped housing 21 defined by the peripheral wall 22. Supported on a part of the wall 22 is a bracket 48 which carries ears 49 on which are pivotally supported through rod 49b, a series of contact arms 50, one for each collector ring 46. Each arm 50 carries a contact brush 51, each brush being spring pressed by spring 52 against its one of the collector rings 46. A series of conductors 53 extend from brushes 51 through the wall 22 and are connected to a series of cables 53 running from the power unit 15 and the traction controller, all as will be readily understood.

Each of the collector rings 46 has a lug 55, and a suitable conductor 56 is secured to the lug of each of the conductor rings and extends to an appropriate part of the traction motor, whereby the motor may be actuated in accordance with the usual practice. The lugs 55 are circularly spaced, as is best illustrated in Fig. 6, so as not to interfere with one another, and so as to leave sufficient space for the conductors 56, and for a brake controlling rod 57 which is mounted for vertical movement through the steering center of the truck, and of course through the center of the collector rings 46.

As shown best in Fig. 10, the brake actuating rod 57 is secured through washers 58 and 59 and a nut 60 to a shaft 61 suitably mounted in a split bearing 62 at the end of an operating lever 63. The rod 57 may rotate relatively to the shaft 61 on washers 58 and 59, but moves vertically with the said shaft 61 as the lever 63 is rocked, the shaft 61 rotating relatively to its split bearing 62. As is probably best shown in Figs. 3 and 4, the operating lever 63 is secured for movement integrally with shaft 64, which shaft has bearings 65 and 66 in the wall 22 (Fig. 6). The shaft 64 is rotated through linkage including parts 67, 68, 69 and 70 by the foot pedal 19. Depression of the foot pedal 19 will therefore move the rod 57 vertically, as is probably best illustrated in Figs. 1, 4 and 8, and through additional linkage including members 71, 72 will rotate a cam 73, best shown in Fig. 4, which cam will spread the brake shoes 74 of the traction brake 75.

Since the rod 57 moves vertically in the steering axis, and is free to rotate in the said axis relatively to the main shaft 61, it is obvious that regardless of the position of the steering unit, pedal 19 will release or set the brake shoes 74 in a most effective manner.

I shall now describe the control of the steering motor 41 of the steering assembly 40, particularly with the intention of pointing out just how the steering motor circuit is broken whenever the steering unit reaches one of two extreme positions.

Referring now to Fig. 11, the power unit 15 and its relation to the steering motor 41 is illustrated, the steering controller being designated generally by the reference letter C. For purposes of simplicity, I do not show the various speed circuits of the steering motor 41 and their relation to the several segments of the controller, but show only the pair of segments 76 and 77 which are adapted to control the circuit of a contactor 78, the function of which was described generally in the first part of my specification, and certain additional segments for determining the direction of operation of the motor 41.

In Fig. 11, it is obvious that when the circuit through coil 79 of the contactor 78 is open, the armature of coil 79 which forms the movable part of switch 80 is in open position. The circuit through the motor 41 will therefore be open. It is only when the coil 79 is energized that the switch 80 is closed, and it is possible to actuate the motor 41 by sending current therethrough from power source 15 under the control of the controller C.

The circuit of the contactor 78 is controlled by a pair of controller brushes 81 and 82, shown functionally and diagrammatically in Fig. 11, but best illustrated mechanically in Figs. 6 and 7. In Figs. 6 and 7, it will be noted that the controller brushes 81 and 82 are supported by a bracket 80a carried by wall 22, and lie against the uppermost collector ring 46. Since the collector ring 46 is in the circuit of the power source, it will be obvious that power will flow through the brushes 81 and 82 from the collector ring 46 under certain conditions.

For breaking the circuit between either of the brushes 81 and 82 and collector ring 46, I form the uppermost insulating ring 47 with cam portions 83 and 84. As the steering unit rotates into one position, cam portion 83 will move controller brush 82 away from the collector ring 46. As the steering unit rotates in a reverse direction, best shown in Fig. 7, the cam portion 84 moves controller brush 81 out of contact with the collector ring 46. Cams 83 and 84 are illustrated diagrammatically in Fig. 11, to which figure I shall now refer for a description of the operation of the contactor and controller circuits.

With the controller brushes 81 and 82 against the collector ring 46, and with, let us say, the segment 76 of the controller C bridging contacts 85 and 86 of the controller, a circuit will be established through contactor 78, as follows: the power source 15, conductor 87, coil 79, collector ring 46, controller brush 82, contact 85, segment 76, contact 86, and conductor 88 to the other side of the power source 15. The closing of the contactor circuit will, of course, close switch 80, and a particular directional circuit will be completed through the controller C and the motor 41 as follows; from the plus side of the power source 15, the switch 80, contact 90, segment 91, contact 92, the motor 41, contact 93, segment 94, contact 95 to the negative side of the power source 15.

Should the operator neglect to stop the rotation of the steering motor in time, as is possible in case of accident, the steering disk and the entire traction assembly will gradually be rotated to one extreme position. In that position, the cam portion 83 contacts the controller brush 82 and moves that brush out of contact with the collector ring 46. This, of course, breaks the circuit through the contactor coil 79 and the switch 80 will be opened, breaking the then circuit of the steering motor 41.

In this position of the parts, the operator may, however, steer the truck in a reverse direction by reversing the steering motor 41. This he does by rotating the controller until segment 77 bridges contacts 86 and 89. When this is done, a circuit will now be established from the power source 15, conductor 87, contactor coil 79, collector ring 46, controller brush 81, contact 89, segment 77, contact 86, conductor 88, back to power source 15. The closing of the circuit through the contactor coil 79, of course closes the switch 80, and a circuit is reestablished through the motor 41 as follows; from the plus side of the power source 15, the switch 80, contact 90, segment 96, segment 97, contact 93, motor 41, contact 92, segment 98, segment 99, and contact 95 to the negative side of power source 15. The movement of the controller has now reversed the steering motor, so that the steering apparatus is moved away from its then extreme position and in the direction of its other extreme position. Should it be moved too far in its new direction, the cam 84 will function to move the controller brush 81 out of position, as in Fig. 7, halting the movement.

My invention having been described in a manner which will make its operation apparent to those skilled in the art, I now claim:

1. In a truck of the class described, a main frame, a steering disk rotatably mounted relatively to said main frame while supporting said main frame, a power traction assembly including an electric traction motor and a pair of substantially spaced load wheels driven thereby, means mounting said entire power traction assembly for limited pivotal movement as a unit relatively to said steering disk, and means for rotating said steering disk.

2. In a truck of the class described, a main frame, a steering disk rotatably mounted upon said main frame and in supporting relation thereto, a power traction assembly including an electric traction motor and a pair of wheels driven thereby, a horizontally extending shaft fixed to said traction assembly, bearings for said shaft formed on said steering disk for mounting said power traction assembly for pivotal movement as a unit relatively to said steering disk while supporting said disk, and means for rotating the steering disk and traction assembly.

3. In a truck of the class described, a main frame, a steering disk rotatably mounted relatively to said main frame while supporting said main frame, a ring gear formed on said disk, a power traction assembly including an electric traction motor and a pair of wheels driven thereby, a horizontally extending shaft fixed to said traction assembly, bearings formed on said steering disk for mounting said power traction assembly for limited pivotal movement relatively to said steering disk, a steering motor on said main frame, and a pinion driven by said steering motor for rotating said ring gear and the steering disk.

4. In a truck of the class described, a main frame, a steering disk rotatably mounted upon said main frame and having a ring gear formed thereon, a power traction assembly including an electric traction motor and a pair of wheels driven thereby, means mounting said power traction assembly on said steering disk, a steering motor and a gear train driven thereby, a shaft driven by said steering motor through said gear train, a bearing on said main frame for said shaft and through which said steering motor and gear train are supported, a pinion on said shaft for meshing with said ring gear to rotate said steering disk, and means between said steering motor and main frame for accepting the torque of said steering motor.

5. In a truck of the class described, a main frame, a rotating steering disk rotatably mounted upon said main frame, a power traction assembly including an electric traction motor and a pair of wheels driven thereby, a brake assembly included in said power traction assembly, means mounting said traction assembly on said steering disk for rotation therewith, a rod mounted vertically in the axis of rotation of said traction assembly, operating means for moving said rod vertically in its axis, and means of connection between said operating means, said rod and said brake whereby movement of said rod by said operating means actuates said brake in all steering positions of said disk and traction assembly.

6. In a truck of the class described, a main frame having an inverted cup shaped housing defined by a continuous vertical wall and with the lip of said cup shaped housing in the form of a horizontally extending flange, a steering disk, bearings between said disk and the horizontal flange of said housing whereby said disk supports said housing and main frame while rotating freely relatively thereto, a power traction assembly including a traction electric motor and brake mounted on said steering disk for supporting the said disk, a series of collector rings stacked vertically on said disk and extending upwardly into said cup shaped housing with their centers coinciding with the axis of rotation of said disk, contact brushes for said collector rings mounted on the said vertical wall of said housing, a brake actuating device extending downwardly through the center of said collector rings, and means mounted on said cup shaped housing for operating said brake actuating device.

7. In a truck of the class described, a main frame, a rotating steering member rotatable relatively to said main frame, a power traction unit including a traction motor carried by said steering member, an electric steering motor for rotating said steering member and traction unit whereby to steer said truck, collector rings rotatable with said steering member, contact means on said main frame cooperating with said collector rings for transmitting electric power to said traction motor, an electric circuit for said steering motor, a control circuit for said electric circuit including one of said collector rings, and means for breaking said circuit when said rotating steering member reaches a predetermined rotated position.

8. In a truck of the class described, a main frame, a rotating steering member rotatable relatively to said main frame, a power traction unit including a traction motor carried by said steering member, an electric steering motor for rotating said steering member and traction unit whereby to steer said truck, collector rings rotatable with said steering member, contact means on said main frame cooperating with said collector rings for transmitting electric power to said traction motor, an electric circuit for said steering motor, an electric control circuit for said electric circuit including one of said collector rings and a brush mounted on said main frame, and means for breaking said circuit between said brush and collector ring when said rotating steering member reaches a predetermined rotated position.

9. In a truck of the class described, a main frame, a steering disk rotatably mounted upon said main frame, a power traction assembly including an electric traction motor and a pair of wheels driven thereby, means mounting said power traction assembly on said steering disk, a steering motor, electric circuits for said steering motor, a controller for closing said circuits, means actuated by said steering motor for rotating said steering disk, a pair of electric control circuits for said steering motor electric circuits outside and parallel to said electric circuits of said steering motor, contact segments on said controller for closing one or the other of said control circuits, a normally closed switch in each of said control circuits displaced from said contact segments, and means carried by said rotating disk for opening one of said switches in one of the two extreme rotated positions of said disk while leaving the other switch closed, and for opening the other of said switches in the other of said extreme rotated positions while leaving the first of said switches closed.

10. In a truck of the class described, a main frame, a steering disk rotatably mounted upon said main frame, a steering motor, means driven by said steering motor for rotating said steering disk, the closing of one of said circuits being a prerequisite to the steering of said truck in one direction, the closing of the other of said circuits being a prerequisite to the steering of the truck in a reverse direction, an electric circuit for said steering motor, a controller for closing said electric circuit, a pair of directional contactor circuits parallel to said motor circuit having a contactor therein for controlling said steering motor circuit, the closing of one of said contactor circuits being a requisite to the steering of said truck in one direction, the closing of the other of said contactor circuits being a requisite to the steering of the truck in a reverse direction, contact segments whereby said controller closes one or the other of said directional contactor circuits, a pair of contacts for each of said circuits additional to said controller segments and normally maintained in engagement, and means whereby the rotation of said disk to one or the other of opposite and extreme steering positions moves the pair of contacts of one of said contactor circuits out of engagement while leaving the pair of contacts of the other contactor circuit in engagement so that the truck may be steered in a reverse direction.

11. In a truck of the class described, a main frame, a steering member rotatable relatively to said main frame, an electric steering motor for rotating said steering member to steer said truck, an electric circuit for said steering motor, a controller having directional segments, control circuits for said electric circuit outside and parallel said electric circuit and having a contactor therein whereby to control said electric circuit, each control circuit including a directional segment of said controller, and means for breaking the control circuit including one of said directional segments at a point remote from said segment when said rotating steering member rotates in one direction to one predetermined position, while leaving the other control circuit closed at a corresponding remote point and means for breaking the other of said circuits at its corresponding remote point when said rotating steering member rotates in the reverse direction to another predetermined position.

12. In a truck of the class described, a main frame, a steering member rotatable relatively to said main frame, an electric steering motor for rotating said steering member to steer said truck, an electric circuit for said steering motor, a controller having directional segments, control circuits for said electric circuit outside and parallel said electric circuit and having a contactor therein whereby to control said electric circuit, each control circuit including a directional segment of said controller and a control switch, means for breaking the control circuit including one of said directional segments at said control switch when said rotating steering member rotates in one direction to one extreme position, while leaving the control switch of the other control circuit closed, and means for breaking the other of said circuits at its control switch when said rotating steering member rotates in the reverse direction to an opposite extreme position, the rotation from one extreme position toward the other effecting the closing of the control switch of the control circuit previously broken.

13. In a truck of the class described, a main frame, a steering member rotatable relatively to said main frame, an electric steering motor for rotating said steering member to steer said truck, electric circuits for said steering motor, a controller having directional segments, control circuits for said electric circuits outside and parallel said electric circuits and having a contactor therein whereby to control said electric circuits, each control circuit including a directional segment of said controller and a switch, means for opening the switch of the control circuit including one of said directional segments when said rotating steering member rotates in one direction to one extreme position, means for operating the switch for breaking the other of said circuits when said rotating steering member rotates in the reverse direction to an opposite extreme position, the rotation from one extreme position toward the other effecting the closing of the previously opened switch.

14. In a truck of the class described, a main frame, a steering member rotatable relatively to said main frame, an electric steering motor for rotating said steering member to steer said truck, a collector ring rotatable with said steering member, an electric circuit for said steering motor including a directional controller having directional segments, control circuits for said electric circuit, said control circuits having each a directional segment and a brush in contact with said collector ring, means for opening one control circuit at the brush and collector ring when said rotating steering member rotates to one extreme position, and means for opening the other of said circuits at said brush and collector ring when said rotating steering member rotates to an opposite extreme position.

15. In a truck of the class described, a main frame, a steering member rotatable relatively to said main frame, an electric steering motor for rotating said steering member to steer said truck, a collector ring rotatable with said steering member, an electric circuit for said steering motor including a directional controller having directional segments, each of said directional segments being in a circuit including a brush in contact with said collector ring, means for opening the circuit through one of said directional segments at the brush and collector ring when said rotating steering member rotates to one extreme position, means for opening the circuits through the other of said directional segments at said brush and collector ring when said rotating steering member rotates to an opposite extreme position, the rotation of the steering member and its collector ring from one extreme position toward the other effecting the closing of the previously opened circuit at said brush and collector ring.

16. In a truck of the class described, a main frame, a steering member rotatable relatively to said main frame, a power traction unit including a traction motor carried by said steering member, an electric steering motor for rotating said steering member and traction unit whereby to steer said truck, collector rings rotatable with said steering member, contact means on said main frame cooperating with said collector rings for transmitting electric power to said traction motor, electric circuits for said steering motor including a directional controller, control circuits for said electric circuits including a pair of directional segments in said controller and one of said collector rings, and means for breaking the control circuit including one of said directional segments when said rotating steering member rotates to one extreme position, and means for breaking the other of said circuits when said rotating steering member rotates to the opposite extreme position.

17. In a truck of the class described, a main frame, a steering member rotatably mounted upon said main frame, a steering motor for rotating said member, electric circuits for said motor, a controller for said steering motor circuits, a pair of contactor control circuits outside and parallel the electric circuits for said motor, means whereby the closing of one of said contactor circuits is a prerequisite to the closing of an electric circuit through said controller and steering motor for steering in one direction, while the closing of the other of said contactor circuits is a prerequisite to the closing of an electric circuit through said controller and steering motor for steering in an opposite direction, a control switch for each of said contactor circuits, and means whereby said steering member operates the control switch for that contactor circuit corresponding to the direction in which the said steering member is moving, when said steering disk reaches a predetermined extreme position, while not disturbing the other of said switches.

18. In a truck of the class described, a main frame, a steering disk rotatably mounted upon said main frame, a steering motor for rotating said disk, electric circuits for said motor, a controller for said steering motor circuits, a pair of contactor control circuits, means whereby the closing of one of said contactor circuits is a prerequisite to the closing of an electric circuit through said controller and steering motor for steering in one direction, while the closing of the other of said contactor circuits is a prerequisite to the closing of an electric circuit through said controller and steering motor for steering in an opposite direction, a normally closed switch in each of said contactor circuits operated by the steering disk, a pair of contacts adapted to be bridged also in each of said contactor circuits, segments adapted to bridge the contacts of one contactor circuit when said steering controller is in one directional position and to bridge the contacts of the other circuit when the steering controller is in another directional position, and means for opening the switch of one of said contactor circuits in one extreme position of said steering disk, and for opening the switch of the other of said contactor circuits in the opposite extreme position of said steering disk.

19. In a truck of the class described, a main frame, a steering disk rotatably mounted upon said main frame, a steering motor for rotating said disk, electric circuits for said motor, a controller for said steering motor circuits, a pair of contactor control circuits, means whereby the closing of one of said contactor circuits is a prerequisite to the closing of an electric circuit through said controller and steering motor for steering in one direction, while the closing of the other of said contactor circuits is a prerequisite to the closing of an electric circuit through said controller and steering motor for steering in an opposite direction, a normally closed switch in each of said contactor circuits operated by the steering disk, and a pair of contacts adapted to be bridged also in each of said contactor circuits, segments adapted to bridge the contacts of one contactor circuit when said steering controller is in one directional position and to bridge the contacts of the other circuit when the steering controller is in another directional position, cam means for opening the switch of one of said contactor circuits in one extreme position of said steering disk, and for opening the switch of the other of said contactor circuits in the opposite extreme position of said steering disk, said cam means releasing for closing either of the said switches when said disk moves away from either of said extreme positions.

20. In a truck of the class described, a main frame, a steering disk rotatably mounted at one end of said main frame and in supporting relation to said main frame, a power traction unit including a brake carried by said disk and in supporting relation thereto, an upstanding sleeve-like member composed of collector rings and insulating rings supported by said disk, a series of brushes supported in a vertical stack by said main frame and in juxtaposition to said collector rings so as to remain in electrical contact with said rings as said steering disk rotates, said main frame and steering disk having openings therein, a vertically moving rod mounted in the axis of rotation of said disk and traversing the said openings and the centers of said collector rings, and means whereby said rod operates the brake of said power traction unit in all steering positions of the unit.

21. In a truck of the class described, a main frame, an operator's platform formed in the center of said main frame, a rotating steering member rotatably mounted at one end of said main frame, a power traction assembly including an electric traction motor and a pair of wheels driven thereby, a brake included in said power traction assembly, means mounting said power traction assembly on said steering member for rotation therewith relatively to said main frame, a brake actuating device mounted for movement in the axis of rotation of said steering member, said steering member having an opening through which said device extends, means of connection between said device and said brake whereby said device operates said brake, a brake operating pedal pivoted to said operator's platform, and means of connection between said pedal and said device for moving said device to actuate said brake, said two means of connection maintaining said actuating device, said brake operating pedal and said brake in operating relation in all rotated positions of said rotating steering member and said power traction assembly.

22. In a truck of the class described, a main frame, an operator's platform formed in the center of said main frame, a rotating steering member rotatably mounted at one end of said main frame, a power traction assembly including an electric traction motor and a pair of wheels driven thereby, a brake included in said power traction assembly, means mounting said power traction assembly on said steering member for rotation therewith, a brake actuating rod mounted for vertical movement in the axis of rotation of said steering member, said steering member having an opening through which said rod extends, means of connection between said rod and said brake whereby said rod operates said brake by vertical movement thereof, a brake operating pedal pivoted to said operator's platform, and means of connection between said pedal and said rod for moving said rod vertically in said steering axis to actuate said brake in all rotated positions of said rotating steering member and said power traction assembly.

BRONISLAUS ULINSKI.